United States Patent
Burger et al.

(10) Patent No.: US 11,204,492 B2
(45) Date of Patent: *Dec. 21, 2021

(54) NAPHTYL BASED HIGH INDEX HYDROPHOBIC LIQUIDS AND TRANSMISSION RECOVERY AGENTS FOR LIQUID LENS FORMULATIONS

(71) Applicant: CORNING INCORPORATED, Corning, NY (US)

(72) Inventors: Benjamin Jean-Baptiste Francois Burger, Lyons (FR); Geraldine Malet Vasseur, Villeurbanne (FR)

(73) Assignee: Corning Incorporated, Corning, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/734,704

(22) Filed: Jan. 6, 2020

(65) Prior Publication Data

US 2020/0142180 A1 May 7, 2020

Related U.S. Application Data

(63) Continuation of application No. 16/375,124, filed on Apr. 4, 2019, now Pat. No. 10,558,031, which is a (Continued)

(51) Int. Cl.
*G02B 26/00* (2006.01)
*G09G 3/34* (2006.01)
(Continued)

(52) U.S. Cl.
CPC ............. *G02B 26/005* (2013.01); *G01C 5/04* (2013.01); *G02B 26/004* (2013.01); *G09G 3/348* (2013.01); *G02B 26/08* (2013.01); *G09G 3/3433* (2013.01)

(58) Field of Classification Search
CPC ........ G01C 5/04; G09G 3/348; G09G 3/3433; G02B 26/00; G02B 26/004; G02B 26/005; G02B 26/08
(Continued)

(56) References Cited

U.S. PATENT DOCUMENTS 4,666,299 A  5/1987 Tamaki et al.
4,838,665 A  6/1989 Hasegawa et al.
(Continued)

FOREIGN PATENT DOCUMENTS

EP  1816491 A1  8/2007
EP  1816504 A1  8/2007
(Continued)

OTHER PUBLICATIONS

Berge et al; "Liquid Lens Based on Electrowetting: Actual Developments on Larger Aperture and Multiple Electrodes Design for Image Stabilization or Beam Steering," Proc. SPIE 8616, 861601 (2013.
(Continued)

*Primary Examiner* — William R Alexander

(57) ABSTRACT

An electrowetting optical device is provided. The electrowetting optical device includes a conductive liquid and a non-conductive liquid. The non-conductive fluid includes a naphthalene based compound having Formula (I), Formula (II), and/or Formula (III):

(Continued)

-continued

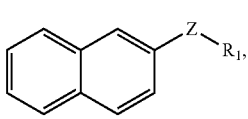

(II)

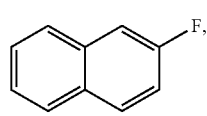

(III)

where $R_1$, $R_2$, and $R_3$ are individually alkyl, aryl, alkoxy, or aryloxy groups; X includes carbon, silicon, germanium, tin, lead, and combinations thereof; and Z includes oxygen, sulfur, selenium, tellurium, polonium, and combinations thereof. The conductive liquid may additionally include a transmission recovery agent having Formula (IV) and/or Formula (V):

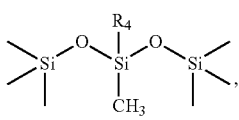

(IV)

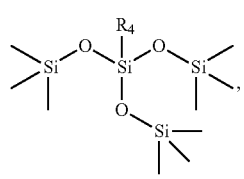

(V)

where $R_4$ is an alkyl, fluoroalkyl, aryl, alkoxy, or aryloxy group. The electrowetting optical device additionally includes a dielectric surface in contact with both the conductive and non-conductive liquids where the conductive and non-conductive liquids are non-miscible.

20 Claims, 4 Drawing Sheets

Related U.S. Application Data continuation of application No. 15/989,989, filed on May 25, 2018, now Pat. No. 10,295,819.

(60) Provisional application No. 62/646,809, filed on Mar. 22, 2018, provisional application No. 62/658,757, filed on Apr. 17, 2018.

(51) Int. Cl.
  *G01C 5/04* (2006.01)
  *G02B 26/08* (2006.01)

(58) Field of Classification Search
  USPC .................................................. 359/290
  See application file for complete search history.

(56) References Cited

U.S. PATENT DOCUMENTS

| | | |
|---|---|---|
| 6,369,954 B1 | 4/2002 | Berge et al. |
| 7,242,528 B2 | 7/2007 | Renders et al. |
| 7,265,911 B2 | 9/2007 | Goosey et al. |
| 7,327,524 B2 | 2/2008 | Renders et al. |
| 7,413,306 B2 | 8/2008 | Campbell |
| 7,780,874 B2 | 8/2010 | Liogier D'Ardhuy et al. |
| 7,791,814 B2 | 9/2010 | Liogier D'ardhuy et al. |
| 7,853,139 B2 | 12/2010 | Tsuchiya |
| 7,929,218 B2 | 4/2011 | Mohr et al. |
| 7,978,400 B2 | 7/2011 | Takemoto et al. |
| 8,027,096 B2 | 9/2011 | Feng et al. |
| 8,416,504 B2 | 4/2013 | Okita et al. |
| 8,427,753 B2 | 4/2013 | Bartels et al. |
| 8,649,102 B2 | 2/2014 | Berge et al. |
| 9,018,299 B2 | 4/2015 | Hosaka et al. |
| 9,063,282 B2 | 6/2015 | Depfenhart |
| 9,335,538 B2 | 5/2016 | Naito et al. |
| 9,939,630 B2 | 4/2018 | Burger et al. |
| 10,072,822 B2 | 9/2018 | Ramer et al. |
| 10,072,882 B2 | 9/2018 | Borchers et al. |
| 10,164,272 B2 | 12/2018 | Ryu et al. |
| 10,295,819 B1 | 5/2019 | Burger et al. |
| 10,558,031 B2 * | 2/2020 | Burger ............... G01C 5/04 |
| 2006/0209422 A1 | 9/2006 | Renders et al. |
| 2006/0215274 A1 | 9/2006 | Renders et al. |
| 2007/0177276 A1 | 8/2007 | Liogier D'ardhuy et al. |
| 2007/0179200 A1 | 8/2007 | Liogier D'Ardhuy et al. |
| 2007/0179201 A1 | 8/2007 | Maillard et al. |
| 2008/0225378 A1 | 9/2008 | Weikert et al. |
| 2008/0310031 A1 | 12/2008 | Mohr et al. |
| 2011/0141539 A1 | 6/2011 | Maillard et al. |
| 2017/0261867 A1 | 9/2017 | Kaller et al. |
| 2017/0363270 A1 | 12/2017 | Ramer et al. |
| 2019/0244573 A1 | 8/2019 | Schultz et al. |
| 2019/0244574 A1 | 8/2019 | Schultz et al. |

FOREIGN PATENT DOCUMENTS

| | | |
|---|---|---|
| EP | 2321393 A1 | 5/2011 |
| WO | 2004099830 A1 | 11/2004 |
| WO | 2010013347 A1 | 2/2010 |
| WO | 2012003026 A2 | 1/2012 |
| WO | 2012143304 A2 | 10/2012 |

OTHER PUBLICATIONS

International Search Report and Written Opinion PCT/US2019/023344 dated Jun. 26, 2019, 11 PGS.
Macnica, "Liquid Optics: Product Catalog, Varioptic dynamic lens", Varioptic, Invenios France SAS, Jun. 2017, 28 pgs.

* cited by examiner

NAPHTYL BASED HIGH INDEX HYDROPHOBIC LIQUIDS AND TRANSMISSION RECOVERY AGENTS FOR LIQUID LENS FORMULATIONS

CROSS-REFERENCE TO RELATED PATENT APPLICATION

This application is a continuation of U.S. application Ser. No. 16/375,124 filed Apr. 4, 2019 which is a continuation of U.S. application Ser. No. 15/989,989 filed on May 25, 2018, which issued as U.S. Pat. No. 10,295,819 on May 21, 2019 which claims the benefit of U.S. Provisional Application No. 62/646,809 filed on Mar. 22, 2018 and U.S. Provisional Application No. 62/658,757 filed on Apr. 17, 2018, which are incorporated herein by reference in their entireties.

FIELD OF THE DISCLOSURE

The disclosure relates to liquid lenses and, more particularly, liquid lenses using high index hydrophobic liquids formulated using naphthyl based compounds and transmission recovery agents.

BACKGROUND

Conventional electrowetting based liquid lenses are based on two immiscible liquids disposed within a chamber, namely an oil and a conductive phase, the latter being water based. The two liquid phases typically form a triple interface on an isolating substrate comprising a dielectric material. Varying an electric field applied to the liquids can vary the wettability of one of the liquids relative to walls of the chamber, which has the effect of varying the shape of a meniscus formed between the two liquids. Further, in various applications, changes to the shape of the meniscus result in changes to the focal length of the lens.

Water is generally used as the main component of the conductive phase because water provides a highly polar component that can readily dissolve salts. However, among the drawbacks of water based conductive phases are the volatility of water, particularly when the electrowetting device is used in warm or hot environments where risks of corrosion can degrade both the oil liquid phase and the electrowetting device itself. Additionally, for liquid lens applications, the use of water frequently leads to its slow evaporation over time and leakage of water outside the liquid lens. As a consequence, when too much water is lost, an air bubble will appear in the liquid lens, which renders the lens ineffective. Finding an oil that is resistant to the corrosive aqueous conductive phase while also providing refractive index and other desired properties is needed.

Accordingly, there is a need for liquids used in liquid lens configurations to provide improved chemical and temperature stability, which can translate into improved liquid lens reliability, performance, and manufacturing cost.

SUMMARY OF THE DISCLOSURE

According to some aspects of the present disclosure, an electrowetting optical device is provided. The electrowetting optical device includes a conductive liquid and a non-conductive liquid including a naphthalene based compound having Formula (I), Formula (II), and/or Formula (III):

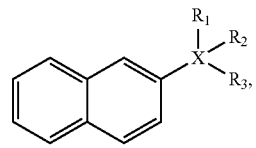

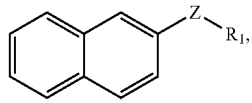

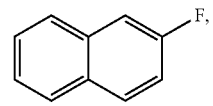

where $R_1$, $R_2$, and $R_3$ are individually alkyl, aryl, alkoxy, or aryloxy groups; X is selected from the group consisting of carbon, silicon, germanium, tin, and lead; and Z is selected from the group consisting of oxygen, sulfur, selenium, tellurium, and polonium. The electrowetting optical device additionally includes a dielectric surface in contact with both the conductive and non-conductive liquids. The conductive and non-conductive liquids are non-miscible.

According to other aspects of the present disclosure, an electrowetting optical device is provided. The electrowetting optical device includes a conductive liquid and The non-conductive fluid includes a naphthalene based compound having Formula (I), Formula (II), and/or Formula (III):

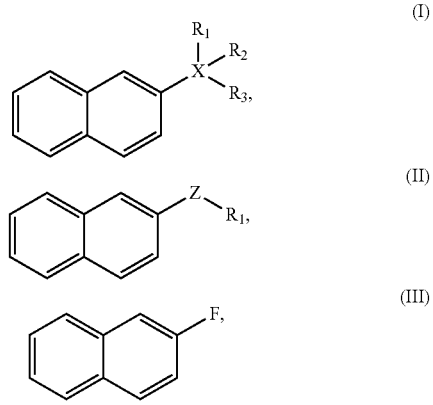

where $R_1$, $R_2$, and $R_3$ are individually alkyl, aryl, alkoxy, or aryloxy groups; X is selected from the group consisting of carbon, silicon, germanium, tin, and lead; and Z is selected from the group consisting of oxygen, sulfur, selenium, tellurium, and polonium. The non-conductive fluid further includes a transmission recovery agent having Formula (IV) and/or Formula (V):

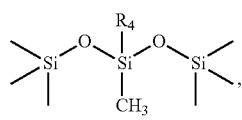

where $R_4$ is an alkyl, fluoroalkyl, aryl, alkoxy, or aryloxy group. The conductive and non-conductive liquids are non-miscible.

According to further aspects of the present disclosure, a non-conductive liquid is provided. The non-conductive fluid includes a naphthalene based compound having Formula (I), Formula (II), and/or Formula (III):

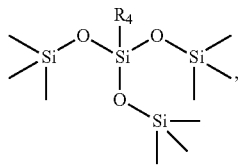
(I)

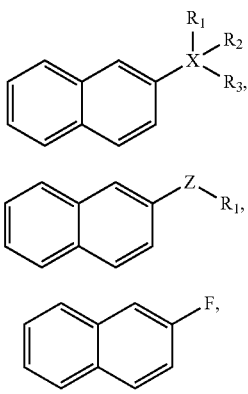
(II)

(III)

where $R_1$, $R_2$, and $R_3$ are individually alkyl, aryl, alkoxy, or aryloxy groups; X is selected from the group consisting of carbon, silicon, germanium, tin, and lead; and Z is selected from the group consisting of oxygen, sulfur, selenium, tellurium, and polonium. The non-conductive fluid further includes a transmission recovery agent having Formula (IV) and/or Formula (V):

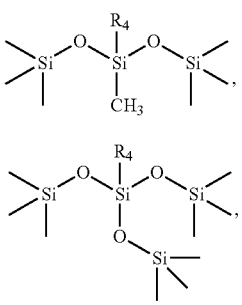
(IV)

(V)

where $R_4$ is an alkyl, fluoroalkyl, aryl, alkoxy, or aryloxy group.

According to further aspects of the present disclosure, a method of making an electrowetting optical device is provided. The method includes providing a conductive liquid and a non-conductive liquid comprising a naphthalene based compound having Formula (I), Formula (II), and/or Formula (III):

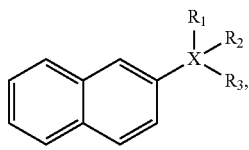
(I)

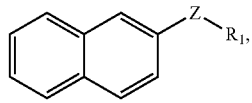
(II)

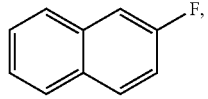
(III)

where $R_1$, $R_2$, and $R_3$ are individually alkyl, aryl, alkoxy, or aryloxy groups; X is a group 14 element selected from the group consisting of carbon, silicon, germanium, tin, and lead; and Z is a group 16 element selected from the group consisting of oxygen, sulfur, selenium, tellurium, and polonium. The non-conductive liquid additionally includes a transmission recovery agent having Formula (IV) and/or Formula (V):

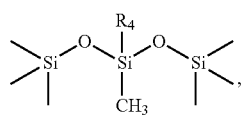
(IV)

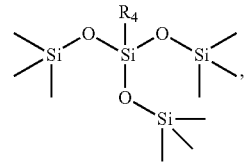
(V)

where $R_4$ is an alkyl, fluoroalkyl, aryl, alkoxy, or aryloxy group. The method further includes contacting a dielectric surface with both the conductive and non-conductive liquids. The conductive and non-conductive liquids are non-miscible.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure and the appended claims.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
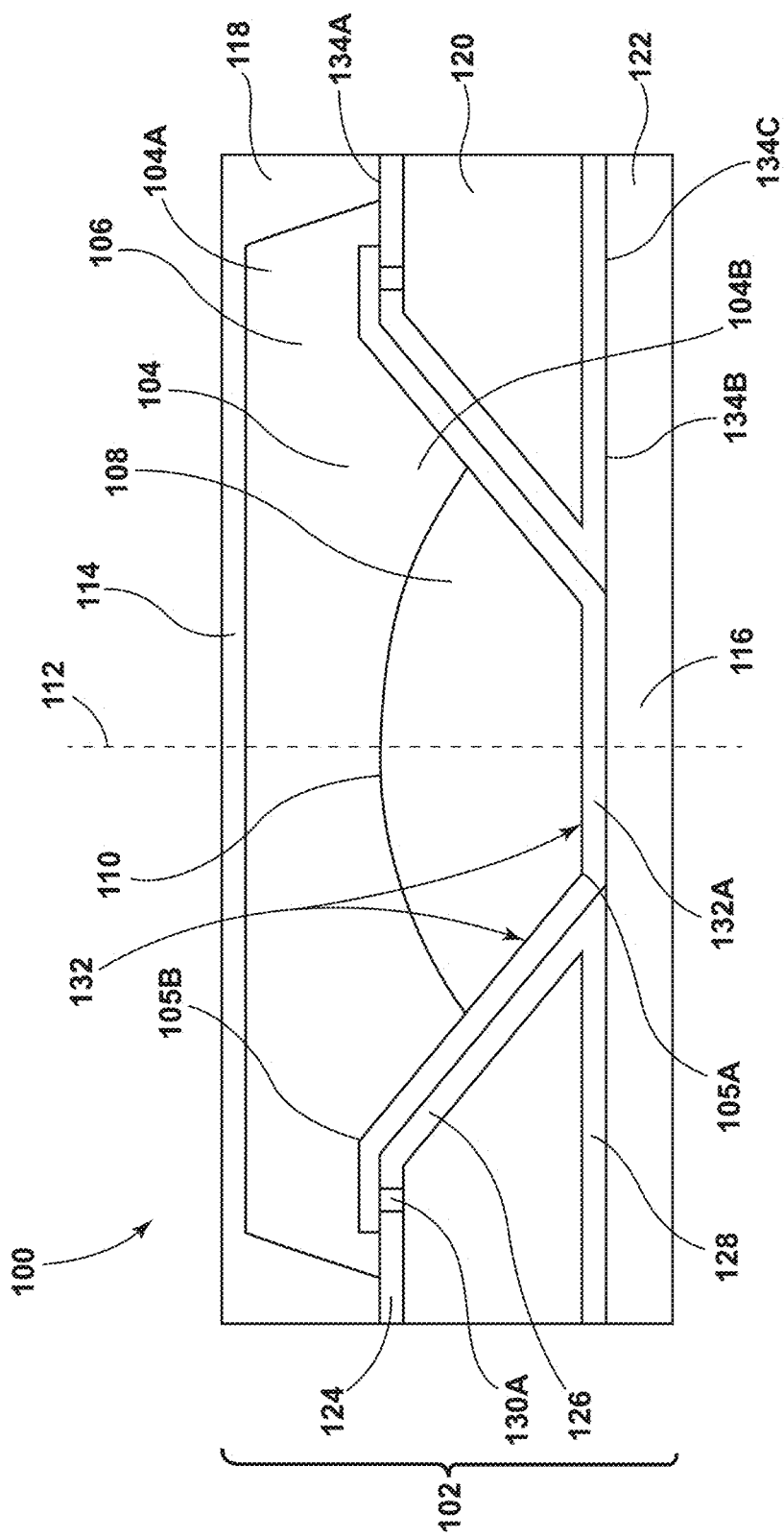
FIG. 1 is a schematic cross-sectional view of an exemplary electrowetting optical device according to some embodiments of the present disclosure.

Additional features and advantages will be set forth in the detailed description which follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom-are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

The terms "non-miscible" and "immiscible" refer to liquids that do not form a homogeneous mixture when added together or minimally mix when the one liquid is added into the other. In the present description and in the following claims, two liquids are considered non-miscible when their partial miscibility is below 2%, below 1%, below 0.5%, or below 0.2%, all values being measured within a given temperature range, for example at 20° C. The liquids herein have a low mutual miscibility over a broad temperature range including, for example, −30° C. to 85° C. and from −20° C. to 65° C.

The term "conductive liquid", as used herein means a liquid having a conductivity from about $1 \times 10^{-3}$ S/m to about $1 \times 10^{2}$ S/m, from about 0.1 S/m to about 10 S/m, or from about 0.1 S/m to about 1 S/m. The term "non-conductive liquid", as used herein means a liquid having a conductivity less than about $1 \times 10^{-8}$ S/m, less than about $1 \times 10^{-10}$ S/m, or less than about $1 \times 10^{-14}$ S/m.

In various embodiments, an electrowetting optical device is provided. The electrowetting optical device includes a conductive liquid and a non-conductive liquid. The non-conductive liquid includes a naphthalene based compound having Formula (I), Formula (II), and/or Formula (III):

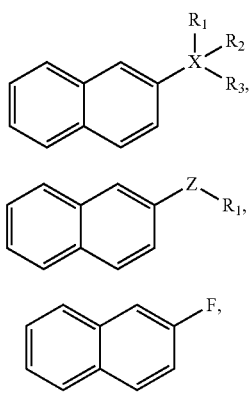

(I)

(II)

(III)

where $R_1$, $R_2$, and $R_3$ are individually alkyl, aryl, alkoxy, or aryloxy groups; X is a group 14 element including carbon, silicon, germanium, tin, lead, and combinations thereof; and Z is a group 16 element including oxygen, sulfur, selenium, tellurium, polonium, and combinations thereof. The electrowetting optical device additionally includes a dielectric surface in contact with both the conductive and non-conductive liquids where the conductive and non-conductive liquids are non-miscible.

In some embodiments, the conductive liquid may additionally include a transmission recovery agent having Formula (IV) and/or Formula (V):

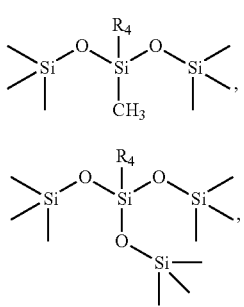

(IV)

(V)

where $R_4$ is an alkyl, fluoroalkyl, aryl, alkoxy, or aryloxy group. In embodiments using the transmission recovery agent, the electrowetting optical device will include a dielectric surface in contact with both the conductive and non-conductive liquids where the conductive and non-conductive liquids are non-miscible.

As described in more detail below in FIG. 1, a cell of an electrowetting optical device or liquid lens is generally defined by two transparent insulating plates and side walls. The lower plate, which is non-planar, comprises a conical or cylindrical depression or recess, which contains a non-conductive or insulating liquid. The remainder of the cell is filled with an electrically conductive liquid, non-miscible with the insulating liquid, having a different refractive index and substantially the same density. One or more driving electrodes are positioned on the side wall of the recess while a portion on the rear face of the lower plate provides electrical contact. An insulating thin layer may be introduced between the driving electrode(s) and the respective liquids to provide electrowetting on the dielectric surface having long term chemical stability. A common electrode is in contact with the conductive liquid. Through electrowetting phenomena it is possible to modify the curvature of the interface between the two liquids, according to the voltage V applied between the electrodes. Thus, a beam of light passing through the cell normal to the plates in the region of the drop will be focused to a greater or lesser extent according to the voltage applied. The conductive liquid generally is an aqueous liquid containing salts. The non-conductive liquid is typically an oil, an alkane or a mixture of alkanes, possibly halogenated.

In some embodiments, the voltage differential between the voltage at the common electrode and the voltage at the driving electrode can be adjusted. The voltage differential can be controlled and adjusted to move an interface between the liquids (i.e., a meniscus) to a desired position along the sidewalls of the cavity. By moving the interface along sidewalls of the cavity, it is possible to change the focus (e.g., diopters), tilt, astigmatism, and/or higher order aberrations of the liquid lens. Further, during operation of the liquid lens, the dielectric and/or surface energy properties of the liquid lens and its constituents can change. For example, the dielectric properties of the liquids and/or insulating elements can change in response to exposure to the voltage differential over time, changes in temperature, and other factors. As another example, the surface energy of the insulating elements can change in response to exposure to the first and second liquids over time. In still other examples, chemical reactions may exist between constituents of the conductive polar liquid, which can contain highly nucleophilic species, and constituents of the non-conductive liquid. In turn, the changes in the properties of the liquid lens and those of its constituents (e.g., its insulating elements or liquids) can degrade the reliability and performance characteristics of the liquid lens.

Liquid Lens Structure

Referring now to FIG. 1, a simplified cross-sectional view of an exemplary liquid lens 100 is provided. The structure of the liquid lens 100 is not meant to be limiting and may include any structure known in the art. In some embodiments, the liquid lens 100 may comprise a lens body 102 and a chamber, well or cavity 104 formed in the lens body. A first liquid 106 and a second liquid 108 may be disposed within cavity 104. In some embodiments, first liquid 106 may be a polar liquid, also referred to as the conducting liquid. Additionally, or alternatively, second liquid 108 may be a non-polar liquid and/or an insulating liquid, also referred to as the non-conducting liquid. In some embodiments, first liquid 106 and second liquid 108 may be immiscible with each other and have different refractive indices such that an interface 110 between the first liquid and the second liquid forms a lens. In some embodiments, first liquid 106 and second liquid 108 may have substantially the same density, which can help to avoid changes in the shape of interface 110 as a result of changing the physical orientation of liquid lens 100 (e.g., as a result of gravitational forces).

In some embodiments of the liquid lens 100 depicted in FIG. 1, cavity 104 may comprise a first portion, or headspace, 104A and a second portion, or base portion, 104B. For example, second portion 104B of cavity 104 may be defined by a bore in an intermediate layer of liquid lens 100 as described herein. Additionally, or alternatively, first portion 104A of cavity 104 may be defined by a recess in a first outer layer of liquid lens 100 and/or disposed outside of the bore in the intermediate layer as described herein. In some embodiments, at least a portion of first liquid 106 may be disposed in first portion 104A of cavity 104. Additionally, or alternatively, second liquid 108 may be disposed within second portion 104B of cavity 104. For example, substantially all or a portion of second liquid 108 may be disposed within second portion 104B of cavity 104. In some embodiments, the perimeter of interface 110 (e.g., the edge of the interface in contact with the sidewall of the cavity) may be disposed within second portion 104B of cavity 104.

Interface 110 of the liquid lens 100 (see FIG. 1) can be adjusted via electrowetting. For example, a voltage can be applied between first liquid 106 and a surface of cavity 104 (e.g., a/several (e.g., at least two) driving electrode(s) positioned near the surface of the cavity and insulated from the first liquid as described herein) to increase or decrease the wettability of the surface of the cavity with respect to the first liquid and change the shape of interface 110. In some embodiments, adjusting interface 110 may change the shape of the interface, which changes the focal length or focus of liquid lens 100. For example, such a change of focal length can enable liquid lens 100 to perform an autofocus function. Additionally, or alternatively, adjusting interface 110 may tilt the interface relative to an optical axis 112 of liquid lens 100. For example, such tilting can enable liquid lens 100 to perform an optical image stabilization (OIS) function in addition to providing astigmatism variations or higher order optical aberration corrections. Adjusting interface 110 may be achieved without physical movement of liquid lens 100 relative to an image sensor, a fixed lens or lens stack, a housing, or other components of a camera module in which the liquid lens can be incorporated.

In some embodiments, lens body 102 of liquid lens 100 may comprise an outer window, such as first window 114, and an inner window, such as second window 116. In some of such embodiments, cavity 104 may be disposed between first window 114 and second window 116. In some embodiments, lens body 102 may comprise a plurality of layers that cooperatively form the lens body. For example, in the embodiments shown in FIG. 1, lens body 102 may comprise a first outer layer 118, an intermediate layer 120, and a second outer layer 122. In some of such embodiments, intermediate layer 120 may comprise a bore formed therethrough. First outer layer 118 may be bonded to one side (e.g., the object side) of intermediate layer 120. For example, first outer layer 118 may be bonded to intermediate layer 120 at a bond 134A. Bond 134A may be a direct bond such as an adhesive bond, a laser bond (e.g., a laser weld), etc., or bond 134A may be a mechanical coupling or closing (such as a mechanical interlock, fold or crimp seal), or any another suitable coupling capable of maintaining first liquid 106 and second liquid 108 within cavity 104 (e.g., a liquid-tight bond). Additionally, or alternatively, second outer layer 122 may be bonded to the other side (e.g., the image side) of intermediate layer 120. For example, second outer layer 122 may be bonded to intermediate layer 120 at a bond 134B and/or a bond 134C, each of which can be configured as described herein with respect to bond 134A. In some embodiments, intermediate layer 120 may be disposed between first outer layer 118 and second outer layer 122, the bore in the intermediate layer may be covered on opposing sides by the first outer layer and the second outer layer, and at least a portion of cavity 104 may be defined within the bore. Thus, a portion of first outer layer 118 covering cavity 104 may serve as first window 114, and a portion of second outer layer 122 covering the cavity may serve as second window 116.

In some embodiments, cavity 104 may comprise first portion 104A and second portion 104B. For example, in the embodiments shown in FIG. 1, second portion 104B of cavity 104 may be defined by the bore in intermediate layer 120, and first portion 104A of the cavity may be disposed between the second portion of the cavity and first window 114. In some embodiments, first outer layer 118 may comprise a recess as shown in FIG. 1, and first portion 104A of cavity 104 may be disposed within the recess in the first outer layer. Thus, first portion 104A of cavity may be disposed outside of the bore in intermediate layer 120.

In some embodiments, cavity 104 (e.g., second portion 104B of the cavity) may be tapered as shown in FIG. 1 such that a cross-sectional area of the cavity decreases along optical axis 112 in a direction from the object side to the image side. For example, second portion 104B of cavity 104 may comprises a narrow end 105A and a wide end 105B. The terms "narrow" and "wide" are relative terms, meaning the narrow end is narrower than the wide end. Such a tapered cavity can help to maintain alignment of interface 110 between first liquid 106 and second liquid 108 along optical axis 112. In other embodiments, the cavity is tapered such that the cross-sectional area of the cavity increases along the optical axis in the direction from the object side to the image side or non-tapered such that the cross-sectional area of the cavity remains substantially constant along the optical axis.

In some embodiments, image light may enter the liquid lens 100 depicted in FIG. 1 through first window 114, may be refracted at interface 110 between first liquid 106 and second liquid 108, and may exit the liquid lens through second window 116. In some embodiments, first outer layer 118 and/or second outer layer 122 may comprise a sufficient transparency to enable passage of the image light. For example, first outer layer 118 and/or second outer layer 122 may comprise an electrically insulating material and specifically may be a polymeric, glass, ceramic, or glass-ceramic material. In some embodiments, outer surfaces of first outer layer 118 and/or second outer layer 122 may be substantially planar. Thus, even though liquid lens 100 can function as a lens (e.g., by refracting image light passing through interface 110), outer surfaces of the liquid lens can be flat as opposed to being curved like the outer surfaces of a fixed lens. In other embodiments, outer surfaces of the first outer layer and/or the second outer layer may be curved (e.g., concave or convex). Thus, the liquid lens may comprise an integrated fixed lens. In some embodiments, intermediate layer 120 may comprise a metallic, polymeric, glass, ceramic, or glass-ceramic material. Because image light can pass through the bore in intermediate layer 120, the intermediate layer may or may not be transparent.

In some embodiments, liquid lens 100 (see FIG. 1) may comprise a common electrode 124 in electrical communication with first liquid 106. Additionally, or alternatively, liquid lens 100 may comprise a/or several driving electrode(s) 126 disposed on a sidewall of cavity 104 and insulated from first liquid 106 and second liquid 108. Different voltages can be supplied to common electrode 124 and driving electrode(s) 126 to change the shape of interface 110 as described herein.

In some embodiments, liquid lens 100 (see FIG. 1) may comprise a conductive layer 128 at least a portion of which is disposed within cavity 104. For example, conductive layer 128 may comprise a conductive coating applied to intermediate layer 120 prior to bonding first outer layer 118 and/or second outer layer 122 to the intermediate layer. Conductive layer 128 may comprise a metallic material, a conductive polymer material, another suitable conductive material, or a combination thereof. Additionally, or alternatively, conductive layer 128 may comprise a single layer or a plurality of layers, some or all of which can be conductive. In some embodiments, conductive layer 128 may define common electrode 124 and/or driving electrode(s) 126. For example, conductive layer 128 may be applied to substantially the entire outer surface of intermediate layer 118 prior to bonding first outer layer 118 and/or second outer layer 122 to the intermediate layer. Following application of conductive layer 128 to intermediate layer 118, the conductive layer may be segmented into various conductive elements (e.g., common electrode 124 and/or driving electrode 126). In some embodiments, liquid lens 100 may comprise a scribe 130A in conductive layer 128 to isolate (e.g., electrically isolate) common electrode 124 and driving electrode 126 from each other. In some embodiments, scribe 130A may comprise a gap in conductive layer 128. For example, scribe 130A is a gap with a width of about 5 μm, about 10 μm, about 15 μm, about 20 μm, about 25 μm, about 30 μm, about 35 μm, about 40 μm, about 45 μm, about 50 μm, or any ranges defined by the listed values.

As discussed above, in specific embodiments, intermediate layer 120 is formed from a glass, ceramic or glass-ceramic material, and first outer layer 118 is directly bonded (e.g., via a weld, such as a laser weld) to intermediate layer 120 at bond 134A. As discussed above, bond 134A is a liquid-tight bond such that the fluids of the liquid lens are maintained within the lens body and not permitted to pass through bond 134A. Applicant has found that this type of lens body construction provides a variety of advantages not achieved in at least some prior designs. In particular, Applicant has found that a lens body that includes a direct bond between layers 118 and 120, such as is formed by a laser weld or an adhesive, allows for formation of a liquid lens having a lower profile or more compact shape, as compared to arrangements that involve a mechanical coupling (e.g., an interlocking folded or crimped seal) between intermediate layer 120 to first outer layer 118. In fact, in at least some assemblies, a laser weld assembly and use of a ceramic, glass or glass-ceramic material of intermediate layer 120 has allowed formation of liquid lens with a maximum thickness of between 3-5 mm, as compared to about 6 mm achieved with mechanical couplings. Further, Applicant has found that utilizing laser welding provides for improved (e.g., faster, more accurate, etc.) assembly processes for a liquid lens.

As also depicted in FIG. 1, the liquid lens 100 may comprise an insulating layer 132 disposed within cavity 104, on top on the driving electrode layer. For example, insulating element 132 may comprise an insulating coating applied to intermediate layer 120 prior to bonding first outer layer 118 and/or second outer layer 122 to the intermediate layer. In some embodiments, insulating element 132 may comprise an insulating coating applied to conductive layer 128 and second window 116 after bonding second outer layer 122 to intermediate layer 120 and prior to bonding first outer layer 118 to the intermediate layer. Thus, the insulating element 132 may cover at least a portion of conductive layer 128 within cavity 104 and second window 116. In some embodiments, insulating element 132 may be sufficiently transparent to enable passage of image light through second window 116 as described herein.

In some embodiments of the liquid lens 100 depicted in FIG. 1, the insulating element 132 may cover at least a portion of driving electrode 126 (e.g., the portion of the driving electrode disposed within cavity 104) to insulate first liquid 106 and second liquid 108 from the driving electrode. Additionally, or alternatively, at least a portion of common electrode 124 disposed within cavity 104 may be uncovered by insulating element 132. Thus, common electrode 124 may be in electrical communication with first liquid 106 as described herein. In some embodiments, insulating element 132 may comprise a hydrophobic surface layer of second portion 104B of cavity 104. Such a hydrophobic surface layer can help to maintain second liquid 108 within second portion 104B of cavity 104 (e.g., by attraction between the non-polar second liquid and the hydrophobic material) and/or enable the perimeter of interface 110 to move along the hydrophobic surface layer (e.g., by electrowetting) to change the shape of the interface as described herein. Further, the liquid lens 100 shown in FIG. 1, based at least in part on the insulating element 132, may exhibit a contact angle hysteresis (i.e., at the interface 110 between the liquids 106, 108) of no more than 3°. As used herein, the "contact angle hysteresis" refers to the differential in measured contact angles of the second liquid 108 with the insulating element 132 upon a sequential application of a driving voltage to the driving electrode 126 (e.g., the differential between the driving voltage supplied to the driving electrode and the common voltage supplied to the common electrode) from 0V to a maximum driving voltage, followed by a return to 0V (i.e., as relative to the common electrode 124). The initial contact angle without voltage may be a maximum of 25° and increases to the contact angle due to the electrowetting effect may be at least 15° at "the maximum driving voltage", as used herein. In other embodiments the driving voltage may provide an AC 1 kHz voltage. In some embodiments, the useful voltage may range from about 25V to about 70V. The choice of driver used to apply the voltage is not meant to be limiting, and the insulating layer 132 thickness may be tuned to fit any driving voltage range delivered by the selected driver.

To provide a wide range of focal distances, tilt angles, and/or astigmatism variations, a significant difference in the optical index between the conductive and non-conductive liquids is beneficial. Traditionally, the oil composition (non-conductive liquid) has a higher optical index than the conductive phase since the optical index of pure water is about 1.33, but water is usually modified with additives to achieve higher optical index values to meet the specifications of commercial liquid lenses. The description and corresponding material properties for these two respective liquids is provided below.

Conductive Liquid

In some embodiments, the conductive liquid may be an aqueous solution. In other embodiments, the conductive liquid may include no water. In some embodiments, the conductive liquid may include from about 0.01% w/w to about 100% w/w, from about 0.1% w/w to about 50% w/w, from about 0.1% w/w to about 25% w/w, from about 0.1% w/w to about 15% w/w, from about 1% w/w to about 10% w/w, or from about 1% w/w to about 5% w/w of water, based on the total weight of the conductive liquid. In some embodiments, the conductive liquid may include from about 0.01% w/w to about 100% w/w, from about 1% w/w to about 100% w/w, from about 1% w/w to about 50% w/w, from about 50% w/w to about 100% w/w, from about 75% w/w to about 95% w/w, or from about 2% w/w to about 25% w/w of a salt, based on the total weight of the conductive liquid. In some embodiments, the water and/or polar solvent may be mixed with one or more different salts including either organic and/or inorganic salts. The term, "ionic salts", as referred to herein, refers to salts that are totally or substantially dissociated in water (such as an acetate-anion and a cation). Likewise, the term, "ionizable salts", as referred to herein, refers to salts that are totally or substantially dissociated in water, after chemical, physical or physico-chemical treatment. Examples of anions used in these types of salts include, but are not limited to, halides, sulfate, carbonate, hydrogen carbonate, acetate, 2-fluoracetate, 2,2-difluoroacetate, 2,2,2-trifluoroacetate, 2,2,3,3,3-pentafluoropropanoate, triflate, fluoride, hexafluorophosphate, trifluoromethanesulfonate, and mixtures thereof. Examples of cations used in these types of salts include, but are not limited to, alkali/alkaline earth and metallic cations e.g. sodium, magnesium, potassium, lithium, calcium, zinc, fluorinated ammonium, e.g. N-(fluoromethyl)-2-hydroxy-N,N-dimethyl-ethanaminium, and mixtures thereof. In some embodiments, any combination of the above-referenced anions and cations may be used in the conductive liquid.

In some embodiments, at least one organic and/or inorganic ionic or ionizable salt is used to confer conductive properties to the water and decrease the freezing point of the mixed fluid. In some embodiments, the ionic salts may include, for example, sodium sulfate, potassium acetate, sodium acetate, zinc bromide, sodium bromide, lithium bromide, and combinations thereof. In other embodiments, the ionic salt may include fluorinated salts including fluorinated organic ionic salts. In some embodiments, the organic and inorganic ionic and ionizable salts may include, but are not limited to, potassium acetate, magnesium chloride, zinc bromide, lithium bromide, lithium chloride, calcium chloride, sodium sulfate, sodium triflate, sodium acetate, sodium trifluoroacetate and the like, as well as mixtures thereof.

Fluorinated salts, including fluorinated organic ionic salts, can advantageously maintain a relatively low refractive index of the conductive liquid while facilitating changes of the physical properties of the conductive liquid, such as lowering the freezing point of the conductive liquid. Fluorinated salts, unlike traditional chloride salts, may also demonstrate reduced corrosion with the materials constituting the cell of the electrowetting optical device, e.g. the steel, stainless steel, or brass components.

The water used in the conductive liquid is preferred to be as pure as possible, i.e. free, or substantially free, of any other undesired dissolved components that could alter the optical properties of the electrowetting optical device. In some embodiments, ultrapure water (UPW) having a conductivity of about 0.055 μS/cm at 25° C. or a resistivity of 18.2 MOhm is used to form the conductive liquid.

In some embodiments, the conductive liquid may include an anti-freezing agent or freezing-point lowering agent. The use of anti-freezing agents such as salts, alcohols, diols, and/or glycols allows the conductive liquid to remain in a liquid state within a temperature range from about −30° C. to about +85° C., from about −20° C. to about +65° C., or from about −10° C. to about +65° C. In some embodiments, the use of the alcohol and/or glycol additives in the conductive and/or non-conductive liquids can help provide a steady interface tension between the two liquids over a broad range of temperature. Depending on the desired application and properties desired from the conductive liquid and resultant liquid lens, the conductive liquid may include less than about 95% by weight, less than about 90% by weight, less than about 80% by weight, less than about 70% by weight, less than about 60% by weight, less than about 50% by weight, less than about 40% by weight, less than about 30% by weight, less than about 20% by weight, less than about 10% by weight, or less than about 5% by weight anti-freezing agent. In some embodiments, the conductive liquid may include more than about 95% by weight, more than about 90% by weight, more than about 80% by weight, more than about 70% by weight, more than about 60% by weight, more than about 50% by weight, more than about 40% by weight, more than about 30% by weight, more than about 20% by weight, more than about 10% by weight, or more than about 5% by weight anti-freezing agent. In some embodiments, the anti-freezing agent may be a glycol including, for example, monopropylene glycol, ethylene glycol, 1,3-propanediol (trimethylene glycol or TMG), glycerol, dipropylene glycol, and combinations thereof. In some embodiments using glycols, the glycol may have a weight average molecular weight (Mw) from 200 g/mol to 2000 g/mol, from 200 g/mol to 1000 g/mol, from 350 g/mol to 600 g/mol, from 350 g/mol to 500 g/mol, from 375 g/mol to 500 g/mol, or a mixture thereof. In some embodiments, the glycol may be a dimer, trimer, tetramer, or any combination from 2 to 100 monomer diol or triol units including all integers in between. The density of the water based, ethylene glycol based, or glycerol based conductive liquids may range from about from about 1.0 g/cm$^3$ to about 1.5 g/cm$^3$, 1.0 g/cm$^3$ to about 1.25 g/cm$^3$, or from about 1.0 g/cm$^3$ to about 1.15 g/cm$^3$. The optical index of the water based, ethylene glycol based, or glycerol based conductive liquids may range from about 1.33 to about 1.47 at 589.3 nm.

Non-Conductive Liquid

The non-conductive liquid disclosed herein may include one or more naphthalene based compounds and/or one or more transmission recovery agents. Depending on the desired application and corresponding properties of the non-conductive liquid, the non-conductive liquid may include from about 5% w/w to about 20% w/w transmission recovery agent and from about 5 w/w to about 100 w/w naphthalene based compound. In some embodiments, the non-conductive compound may include from about 5% w/w to about 95% w/w, 15% w/w to about 95% w/w, from about 20% w/w to about 95% w/w, from about 40% w/w to about 100% w/w, from about 20% w/w to about 99% w/w, from about 50% w/w to about 99% w/w, from about 65% w/w to about 98% w/w, from about 5% w/w to about 85% w/w, from about 5% w/w to about 65% w/w, from about 5% w/w to about 15% w/w, or from about 70% w/w to about 95% w/w of the naphthalene based compound. In some embodiments, the non-conductive fluid may include from about 1% w/w to about 60 w/w, from about 1% w/w to about 35% w/w, from about 5% w/w to about 25% w/w, or from about 10% w/w to about 20% w/w of the transmission recovery agent. In some embodiments, additional non-reactive compounds, oils, and/or high or low viscosity liquids may be added to the non-conductive fluid to modify the final electrical response properties in an amount from about 0.0001% w/w to about 95% w/w or from 1% w/w to about 60% w/w.

The naphthalene based compounds disclosed herein have demonstrated several physical properties that are beneficial to the application of making liquid lens/electrowetting optical devices. For example, the naphthalene based compounds may have a density at 20° C. from about 0.90 g/cm$^3$ to about 1.25 g/cm$^3$ or from about 0.95 g/cm$^3$ to about 1.20 g/cm$^3$. The naphthalene based compounds may have a refractive index measured at 589.3 nm from about 1.55 to about 1.70 and a viscosity measured at 20° C. from about 5 cSt to about 35 cSt. The density variations of these naphthalene based compounds may range from about $0.7 \times 10^{-3}$ g·cm$^{-3}$*K$^{-1}$ to about $1 \times 10^{-3}$ g·cm$^{-3}$·K$^{-1}$.

In some embodiments, the non-conductive liquid includes one or more naphthalene based compounds having Formula (I), Formula (II), and/or Formula (III):

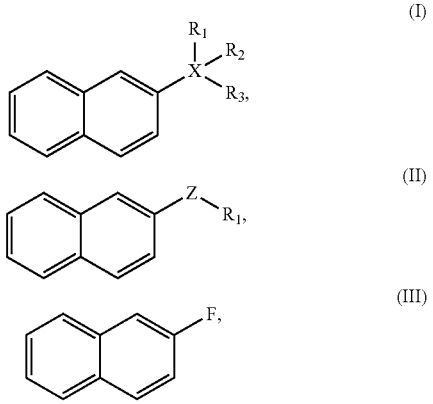

where $R_1$, $R_2$, and $R_3$ are individually alkyl, aryl, alkoxy, or aryloxy groups; X is a group 14 element including, for example, carbon, silicon, germanium, tin, lead, and combinations thereof; and Z is a group 16 element including, for example, oxygen, sulfur, selenium, tellurium, polonium, and combinations thereof. In some embodiments, $R_1$, $R_2$, and $R_3$ are individually alkyl, cycloalkyl, alkenyl, or aromatic residues.

In some embodiments, the naphthalene based compounds disclosed herein are substituted at the 2-position as provided with Formulas (I)-(III). In other embodiments, the naphthalene based compounds may be substituted with the same provided moieties at the 1-position, 2-position, 3-position, 4-position, 5-position, 6-position, 7-position, 8-position, or combinations thereof, the chemical structures of which are incorporated herein by reference in their entirety.

The naphthalene based compounds having Formula (I), Formula (II), and/or

Formula (III) all have a relatively high chemical stability, even with the incorporation of heteroatoms in the structure. Referring to Formula (I), the presence of the group 14 element X provides an electronegativity similar to carbon which provides stability to the covalent bond between X and the naphthalene ring. The stability imparted through, for example, carbon-carbon, carbon-silicon, carbon-germanium, and/or carbon-tin bonds at the X substitution position provides for high thermal stability, even in the presence of water and/or other nucleophilic species. Referring to Formula (II), the presence of the group 16 element Z provides for improved stability of the covalent bond existing between the naphthalene ring and the Z atom. The stability imparted through, for example, carbon-oxygen, carbon-sulfur, and/or carbon-selenium bonds at the Z substitution position provides for high thermal stability, even in the presence of water and/or other nucleophilic species. Referring to Formula (III), the presence of carbon-fluorine bond is very stable and provides a high chemical resistance/inertness to the compound, even in the presence of water and/or other nucleophilic species. Fluorine is selectively used for these naphthalene based compounds rather than other halogenated naphthalene based compounds since the chlorinated, brominated, and/or iodinated analogue compounds are sensitive to nucleophilic substitution reactions and do not make for a stable non-conductive fluid.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" may include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with chemically stable functional groups, for example, olefin, alkyne, cyano, alkoxy, thioether, and/or fluorinated groups. As used herein the term fluoroalkyl is an alkyl group having one or more fluorine groups. In some embodiments, fluoroalkyl refers to a per-fluoroalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbon atoms, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

In some embodiments, the naphthalene based compounds may include 2-trimethylgermane naphthalene (VI), 1-trimethylgermane naphthalene, 2-triethylgermane naphthalene (VII), 1-triethylgermane naphthalene, 2-trimethylsilane naphthalene (VIII), 1-trimethylsilane naphthalene, 2-dimethylbutylsilane naphthalene (IX), 1-dimethylbutylsilane naphthalene, 2-phenylsulfur naphthalene (X), 1-phenylsulfur naphthalene, 2-dimethyloctylsilane naphthalene (XI), 1-dimethyloctylsilane naphthalene, 1-fluoronapthalene (XII), 2-fluoronapthalene, 2-ethylnaphthalene (XIII), 1-ethylnaphthalene, 2-propylnaphthalene (XIV), 1-propylnaphthalene, and combinations thereof, the formulas (VI)-(XIV) of which are provided below:

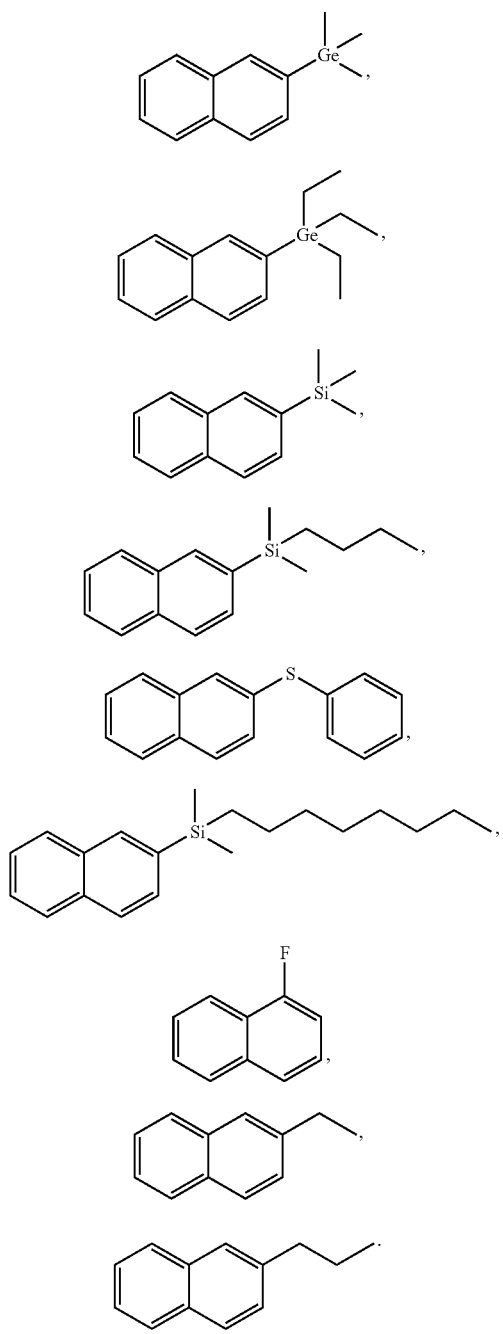

The transmission recovery agents disclosed herein can beneficially provide improved transmission recovery times that are beneficial to liquid lens/electrowetting optical devices, specifically those devices used across a range of temperatures. An improved transmission recovery time designates that the meniscus interface between the two liquids may be maintained across the device's operating temperature range (e.g. from −20° C. to +70° C.) for a given voltage differential. Conventional liquid lenses without transmission recovery agents fail to maintain a constant focal length during use at different temperatures, and therefore, constantly adjust the voltage differential to maintain the meniscus and the corresponding desired focal length, and/or require longer amounts of time to correct focal length when exposed to different temperatures. The transmission recovery agents described herein help to enable improved transmission recovery times of liquid lens/electrowetting optical devices.

In some embodiments, the conductive liquid includes the transmission recovery agent having Formula (IV) and/or Formula (V):

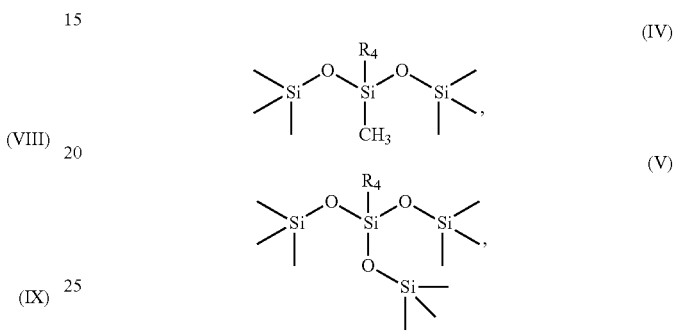

wherein $R_4$ is an alkyl, fluoroalkyl, aryl, alkoxy, or aryloxy group.

In some embodiments, the transmission recovery agent may include alkyltris(trimethylsiloxy)silanes, fluoroalkyltris(trimethylsiloxy), alkylheptamethyltrisiloxanes, fluoroalkylheptamethyltrisiloxanes, and combinations thereof. In other embodiments, the transmission recovery agent may include n-octyltristrimethylsiloxysilane, 3-n-octylheptamethyltrisiloxane, tridecafluorooctyltris(trimethylsiloxy)silane, and combinations thereof.

It has been discovered that the non-conductive liquids (oils) disclosed herein that are used in liquid lens/electrowetting optical applications can provide a wide range of focal distances, tilt angles, and/or astigmatism variations. In order to accomplish these benefits, the non-conductive liquid should meet at least one or more of the following properties: 1) a density matched or similar to the conductive liquid over the operating temperature range of the liquid lens; 2) a high refractive index difference compared to the conductive liquids; 3) a low miscibility with the conductive liquid over the operating temperature range of the liquid lens; 4) chemical stability with respect to each of the non-conductive liquid's components and the nucleophilic water based electrolyte (conductive liquid); and 5) a low viscosity to limit the response time of the liquid lens. In addition, the combination of naphthalene based compounds with transmission recovery agents as disclosed herein provide a new combination of liquid materials used in non-conductive fluids that meet each of the five criteria mentioned above while being able to maintain these properties in the liquid lens/electrowetting optical device across a wide range of temperatures in a static and/or changing environment.

With regards to the density parameter, substantially matching the density of the non-conductive liquid with the density of the conductive liquid can help contribute to a versatile liquid lens/electrowetting optical device having a wide range of focal distances at a variety of tilt angles. In some embodiments, the difference in densities (Δρ) between the non-conductive liquid and conductive liquid may be lower than 0.1 g/cm$^3$, lower than 0.01 g/cm$^3$, or lower than 3.10$^{-3}$ g/cm$^3$ over a broad temperature range including from about −30° C. to about 85° C. or from about −20° C. to about 65° C. The density of the naphthalene base compounds may be higher than comparative aliphatic compounds. For example, 2-ethylnaphthalene is a liquid having a density of about 1.01 g/cm$^3$ at 25° C. while a comparative aliphatic oil such as dodecane has a density of 0.75 g/cm$^3$. The higher density of the naphthalene base compounds with respect to other known or currently used compounds in the art is beneficial since it allows one to better match the density of the non-conductive phase with that of the conductive phase which is typically between about 1.0 g/cm$^3$ and 1.25 g/cm$^3$.

With regards to the refractive index parameter, the aromaticity and π-electron system of the naphthalene base compounds provide a high polarizability and corresponding high refractive index. In some embodiments the non-conductive liquid may have a refractive index from about 1.45 to about 1.60. In some embodiments, the difference in refractive index (Δη) between the conductive liquid and the non-conductive liquid may range from about 0.02 to about 0.24 or from about 0.05 to about 0.15. This optical index range for optical applications includes features such as variable focus, tilt, astigmatism compensations, and tuning the refractive index to optimize the balance precision versus range. In some embodiments, the non-conductive liquid may have a refractive index greater than about 1.60, greater than about 1.64, or greater than about 1.66. In some embodiments, the difference in refractive index (Δη) between the conductive liquid and the non-conductive liquid may be greater than 0.24, greater than 0.27, or greater than 0.29. The increased difference in refractive indices between the two liquids is well suited for optical applications including features such as zoom, variable focus devices, variable illumination devices wherein the illumination depends on the difference of refractive index between two liquids, and/or optical devices where a tilt of the optical axis can be performed, for example used for light beam deflection or image stabilization applications.

With regards to the miscibility parameter, the disclosed conductive and non-conductive liquids are considered non-miscible. In some embodiments, the partial miscibility of the conductive and non-conductive liquids is below 5%, below 2%, below 1%, below 0.2%, below 0.1%, below 0.05%, or below 0.02%, where each of these values may be measured over a broad temperature range including, for example, −30° C. to 85° C. or from −20° C. to 65° C.

With regards to the stability parameter and physical state of the non-conductive liquid, the introduction of the various disclosed substitution groups on the naphthalene ring provides for lower melting points. For example, naphthalene melts at 82° C. while 1-fluoronaphthalene and 2-ethylnaphthalene melt at −13° C. and −14° C., respectively. Most of the naphthalene based compounds disclosed herein are a liquid at room temperature and can be mixed to form homogeneous liquids with other organic compounds to form stable non-conductive fluids. In some embodiments, the non-conductive liquid remains in the liquid state within a temperature range from about −10° C. to about +65° C., from about −20° C. to about +65° C., or from about −30° C. to about +85° C. In addition, the disclosed naphthalene based compounds and transmission recovery agents do not show any detectable signs of decomposition or reaction with the nucleophilic water based electrolyte used in the conducting liquid. Lastly, the individual components of the two fluids are also chemically stable with respect to each other, i.e. they exhibit no chemical reactivity in presence of other compounds of the conducting and non-conducting liquids within the functional temperature range of the device.

With regards to the viscosity parameter, a low viscosity may be desired for the non-conductive liquid since a less viscous fluid is expect to be able to respond quickly to the varying voltages applied through the cell of the liquid lens/electrowetting optical device. The aqueous based conductive layer viscosity is generally low and responds quickly to voltage changes. In some embodiments, the viscosity of the non-conductive liquid may be less than 40 cs, less than 20 cs, or less than 10 cs as measured at all temperatures in the range from −20° C. and +70° C.

Figure 2:
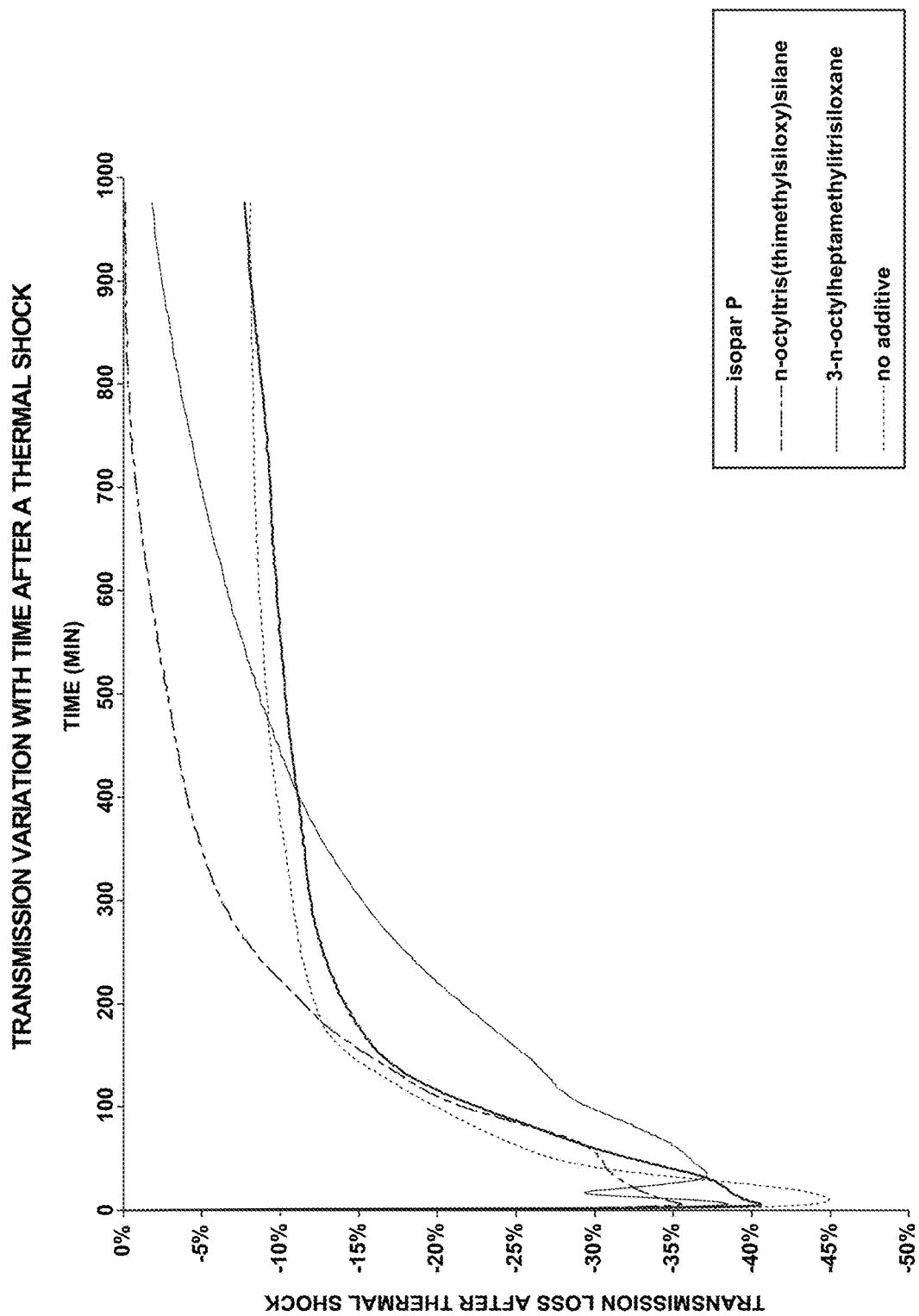
FIG. 2 is a set of transmission curves providing transmission recovery times for various liquid lens configurations including or lacking a transmission recovery agent according to some embodiments of the present disclosure.
Figure 3:
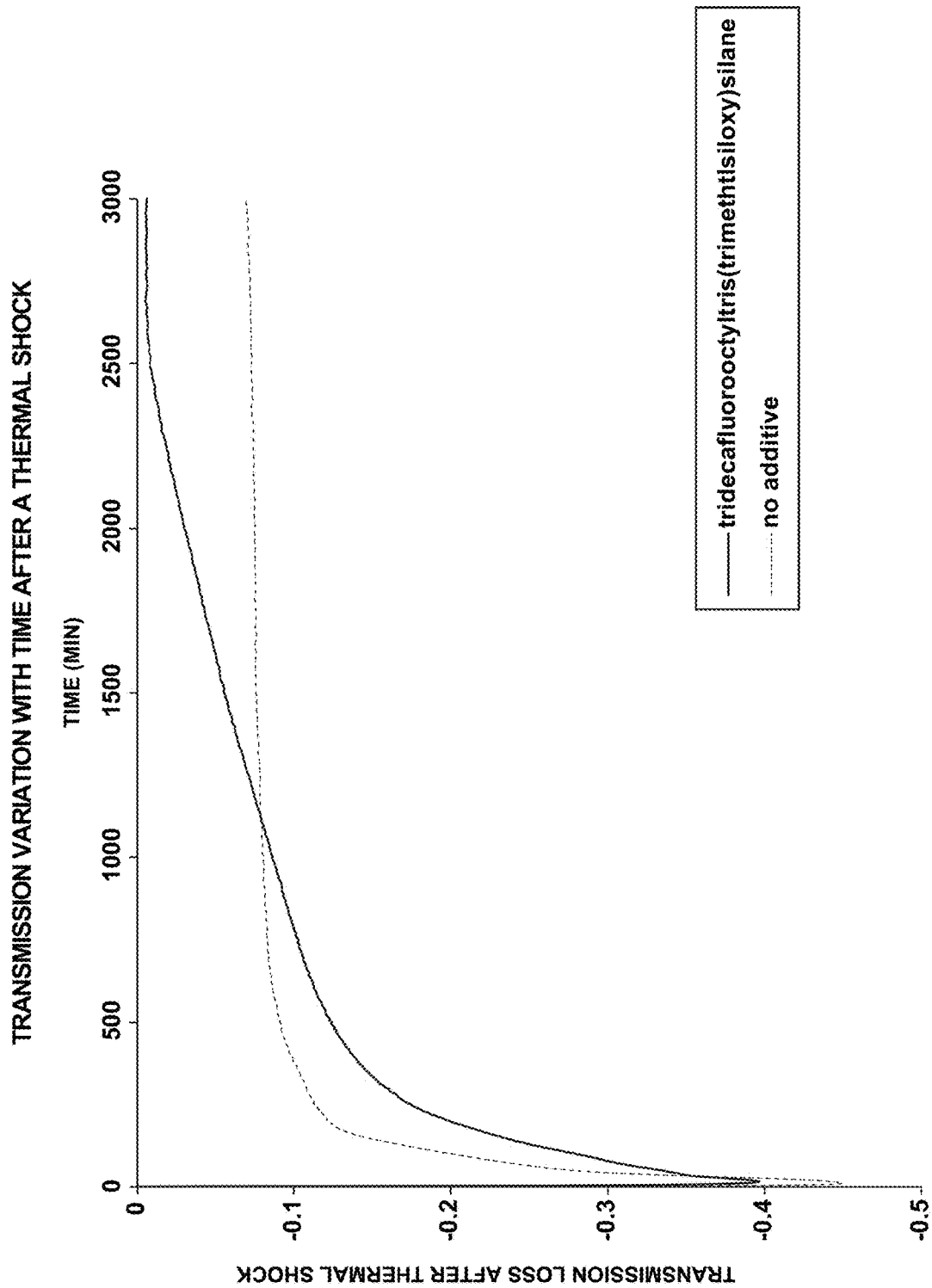
FIG. 3 is a pair of transmission curves providing transmission recovery times for a liquid lens configuration including a transmission recovery agent and one lacking a transmission recovery agent according to some embodiments of the present disclosure.

Referring now to FIGS. 2-3, the transmission recovery times of several liquid lens configurations is provided after a thermal shock. The liquid lenses were prepared according to Varioptic A39N0 design, i.e. the mechanical aperture of the lens is 3.9 mm, the thickness of the oil layer is approximately 0.6 mm, and the thickness of the conductive phase layer is 1.8 mm. Each of the lenses was placed in an oven for 2 hours at 85° C. and 6% relative humidity. The lenses were then respectively placed directly at room temperature and the transmission was measured each minute for 150 minutes, then measured every 2 minutes for 120 minutes, then measured every 5 minutes for 630 minutes, followed lastly by monitoring the transmission every 15 minutes. The evolution of the transmission over time is plotted in FIGS. 2-3 and the relation between the transmission kinetics and the formulation can be determined.

Still referring to FIGS. 2-3, the transmission curves demonstrate that the transmission is recovered both faster and closer to its initial transmittance (T$_o$) when the n-octyltris(trimethylsiloxy)silane, 3-n-octylheptamethyltrisiloxane, or tridecafluorooctyltris(trimethylsiloxy)silane is introduced in the oil formulation. The results for the corresponding references or blanks (no additive or isopar P) demonstrated slow transmission recovery times with respect to the three liquid lenses incorporating the transmission recovery agents. In some embodiments, a transmission recovery of at least 95% may obtained by a liquid lens including one or more transmission recovery agents in less than 4 hrs, less than 5 hrs, less than 6 hrs, less than 7 hrs, less than 8 hrs, less than 9 hrs, or less than 10 hrs.

Figure 4B:
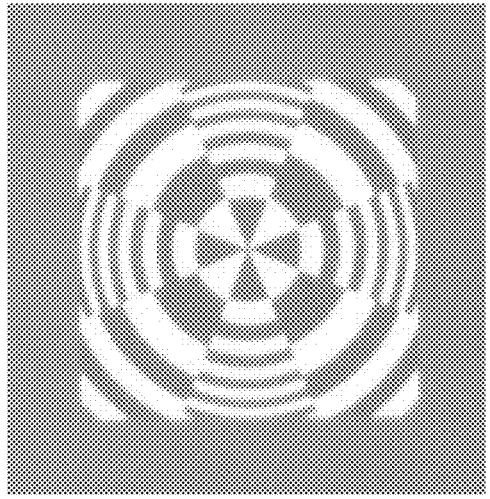
FIGS. 4A-4B are images taken before and after a thermal shock using a lens having no transmission recovery agents incorporated.
Figure 4A:

Referring now to FIGS. 4A-4B, images are provided before and after a thermal shock using a lens having no transmission recovery agents incorporated. The respective conductive and non-conductive liquids were used in a Corning VARIOPTIC® A39N0 liquid lens integrated into an imagery device. The image provided in FIG. 4A was taken before any thermal shock. The device was then placed at 70° C. for 2 hrs and placed at room temperature (about 22° C.) for 2 hrs. The image provided in FIG. 4B was taken using the same lens after the thermal shock at 70° C. and subsequent cool down period. Comparing the images provided in FIGS. 4A and 4B, respectively, demonstrates how the provided thermal shock can affect the quality of image taken. The FIG. 4B image appears washed out with poor contrast when viewed with the FIG. 4A image.

Figure 5B:
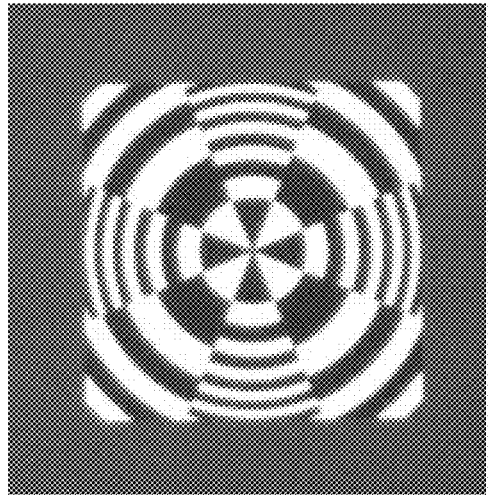
FIGS. 5A-5B are images taken before and after a thermal shock using a lens having transmission recovery agents according to some embodiments of the present disclosure incorporated.
Figure 5A:
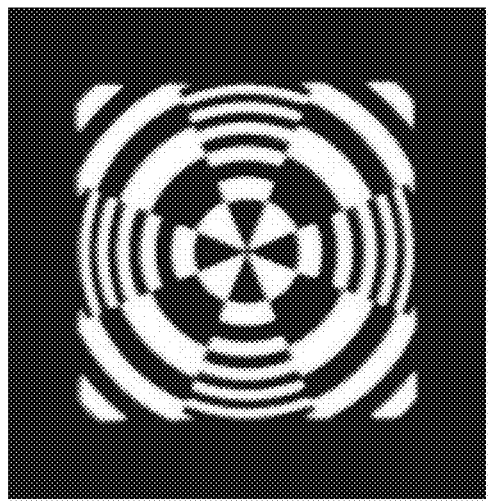

Referring now to FIGS. 5A-5B, images are provided before and after a thermal shock using a lens having transmission recovery agents incorporated. The respective conductive and non-conductive liquids outlined in Example 3 were used in a Corning VARIOPTIC® A39N0 liquid lens integrated into an imagery device. The image provided in FIG. 5A was taken before any thermal shock. The device was then placed at 70° C. for 2 hrs and placed at room temperature (about 22° C.) for 2 hrs. The image provided in FIG. 5B was taken using the same lens after the thermal shock at 70° C. and subsequent cool down period. Comparing the images provided in FIGS. 5A and 5B, respectively, an improvement in the before and after thermal shock images is shown. The FIG. 5B image includes much better contrast with respect to the pre-thermal shock image FIG. 5A than what was provided in the lens having no transmission recovery agent (see FIGS. 4A-4B). In addition, the FIG. 5B depicts sharper lines and more of the features present in the center cross and circle pattern than what was provided in FIG. 4B. Accordingly, the transmission recovery agents described herein help to enable improved transmission recovery times of liquid lens/electrowetting optical devices.

According to some embodiments, the electrowetting optical device includes a voltage source for applying an A.C. voltage to vary the meniscus formed between the conductive and non-conductive liquids to control the focal length of the lens. In some embodiments, the electrowetting optical device further includes a driver or similar electronic device for controlling the lens where the lens and driver or similar electronic device are integrated into the liquid lens. In other embodiments, the electrowetting optical device may include a plurality of lenses incorporating at least one driver or similar electronic device.

The electrowetting optical device may be used as or be part of a variable focal length liquid lens, an optical zoom, an ophthalmic device, a device having a variable tilt of the optical axis, an image stabilization device, a light beam deflection device, a variable illumination device, and any other optical device using electrowetting. In some embodiments, the liquid lens/electrowetting optical device may be incorporated or installed in any one or more apparatuses including, for example, a camera lens, a cell phone display, an endoscope, a telemeter, a dental camera, a barcode reader, a beam deflector, and/or a microscope.

EXAMPLES

The following examples represent a variety of liquid lenses prepared according to Varioptic A39N0 design. The Varioptic A39N0 lens design includes a mechanical aperture of about 3.9 mm, a non-conductive fluid layer thickness of about 0.6 mm, and a conductive fluid layer thickness of about 1.8 mm. The properties measured for these electrowetting optical devices were performed at 20° C.

Materials

Example of the naphthalene based compounds disclosed herein have a listing of some of their physical properties listed below.

Physical Properties of Naphthalene Based Compounds

| Compound | Density at 20° C., cSt | Viscosity at 20° C., cSt | Index at 589.3 nm/ 20° C. | Density variation with temperature g/(cm³K) |
|---|---|---|---|---|
| VI | 1.19 | 6.1 | 1.59 | $0.9 \cdot 10^{-3}$ |
| VII | 1.14 | 10.6 | 1.58 | $0.8 \cdot 10^{-3}$ |
| VIII | 1.01 | 8.1 | 1.58 | $0.8 \cdot 10^{-3}$ |
| IX | 0.97 | 14.9 | 1.57 | $0.7 \cdot 10^{-3}$ |
| X | 1.16 | 33.8 | 1.69 | $0.7 \cdot 10^{-3}$ |
| XI | 0.95 | 25.9 | 1.54 | $0.7 \cdot 10^{-3}$ |
| XII | 1.13 | 2.1 | 1.59 | $0.9 \cdot 10^{-3}$ |
| XIII | 1.01 | 3.9 | 1.61 | $0.7 \cdot 10^{-3}$ |
| XIV | 0.98 | n.d. | 1.58 | $0.7 \cdot 10^{-3}$ |

Solubility of Naphthalene Based Compounds in Polar Liquids used in conductive liquid formulations

| | Solubility in Water (mg/mL) | | Solubility in Ethylene Glycol (mg/mL) | |
|---|---|---|---|---|
| Compound | 20° C. | 85° C. | 20° C. | 85° C. |
| VI | 0.006 | n.d. | 3.4 | 14.8 |
| VII | n.d. | n.d. | 1.9 | 4.2 |
| IX | n.d. | n.d. | 1.1 | 2.1 |
| XI | n.d. | n.d. | 0.44 | 0.68 |

Formulation Example 1

The electrowetting optical device of Example 1 includes: a non-conductive liquid having 75.5 w/w/naphtyltriethylgermane, 15 w/w n-octyltris(trimethylsiloxy) silane, and 9.5% w/w Parrafin oil; and a conductive liquid having 60% w/w monopropylene glycol, 38.8% w/w water, and 1.2% w/w sodium bromide.

| NON-CONDUCTIVE LIQUID | | CONDUCTIVE LIQUID | |
|---|---|---|---|
| % in weight | compound | % in weight | compound |
| 75.5% | Naphtyltriethylgermane | 60% | Monopropylene glycol |
| 15% | n-octyltris(trimethylsiloxy) silane | 38.8% | Water |
| 9.5% | Paraffin oil | 1.2% | Sodium bromide |
| Density: 1.05 g/cm3 | | Density (20° C.): 1.05 g/cm3 | |
| Index (589.3 nm - 20° C.): 1.54 | | Index (589.3 nm - 20° C.): 1.40 | |
| Viscosity (20° C.): 8.3 cSt | | Viscosity (20° C.): 9.9 cSt | |

Formulation Example 2

The electrowetting optical device of Example 2 includes: a non-conductive liquid having 80% w/w/naphthylphenylsulfure and 20% w/w phenyltris(trimethylsiloxyl)silane; and a conductive liquid having 10% w/w 1,3-propandiol, 52% w/w water, 35% w/w ethylene glycol, and 3% w/w potassium acetate.

| NON-CONDUCTIVE LIQUID | | CONDUCTIVE LIQUID | |
|---|---|---|---|
| % in weight | compound | % in weight | compound |
| 80% | Naphthylphenylsulfur | 10% | 1,3-propandiol |
| 20% | Phenyltris(trimethyl-siloxyl)silane | 35% | Ethylene glycol |
| | | 52% | Water |
| | | 3% | Potassium acetate |
| Density: 1.09 g/cm3 | | Density: 1.07 g/cm3 | |
| Index (589.3 nm - 20° C.): 1.63 | | Index (589.3 nm - 20° C.): 1.38 | |
| Viscosity (20° C.): 20 cSt | | Viscosity (20° C.): 3.8 cSt | |

Formulation Example 3

The electrowetting optical device of Example 3 includes: a non-conductive liquid having 100% w/w naphtyltrimethylsilane; and a conductive liquid having 99% w/w water, and 1% w/w potassium acetate.

| NON-CONDUCTIVE LIQUIDS | | CONDUCTIVE LIQUIDS | |
|---|---|---|---|
| % in weight | compound | % in weight | compound |
| 100% | 1-Naphtyltrimethylsilane | 99% | Water |
| | | 1% | Potassium acetate |
| | Density: 1.01 g/cm3 | | Density: 1.00 g/cm3 |
| | Index (589.3 nm - 20° C.): 1.58 | | Index (589.3 nm - 20° C.): 1.34 |
| | Viscosity (20° C.): 8.1 cSt | | Viscosity (20° C.): 1.0 cSt |

Formulation Example 4

The electrowetting optical device of Example 4 includes: a non-conductive liquid having 80% w/w 1-fluoronaphtalene, 10% w/w 1-n-butylnaphtalene, and 10% w/w Phenyltris(trimethylsiloxyl)silane; and a conductive liquid having 50% w/w ethylene glycol, 47% w/w water, and 3% w/w sodium bromide.

| NON-CONDUCTIVE LIQUIDS | | CONDUCTIVE LIQUIDS | |
|---|---|---|---|
| % in weight | compound | % in weight | compound |
| 80% | 1-fluoronaphthalene | 50% | Ethylene glycol |
| 10% | 1-n-butylnaphtalene | 47% | Water |
| 10% | Phenyltris(trimethylsiloxyl)silane | 3% | Sodium bromide |
| | Density: 1.01 g/cm3 | | Density: 1.00 g/cm3 |
| | Index (589.3 nm - 20° C.): 1.58 | | Index (589.3 nm - 20° C.): 1.39 |
| | Viscosity (20° C.): 8.1 cSt | | Viscosity (20° C.): 1.0 cSt |

Formulation Example 5

The electrowetting optical device of Example 5 includes: a non-conductive liquid having 57% w/w/hexaethyldigermane, 30% w/w hexamethyldigermane, 7% w/w Naphtylphenylsulfur, and 6% w/w n-octyltris(trimethysiloxy)silane; and a conductive liquid having 92.8% w/w ethylene glycol, 3% w/w water, and 4.2% w/w potassium acetate.

| NON-CONDUCTIVE LIQUIDS | | CONDUCTIVE LIQUIDS | |
|---|---|---|---|
| % in weight | compound | % in weight | compound |
| 57% | Hexaethyldigermane | 95.8% | Ethylene glycol |
| 30% | Hexamethyldigermane | 4.2% | Potassium acetate |
| 7% | Diphenyldimethylgermane | | |
| 6% | Naphtylphenylsulfur | | |
| | Density: 1.11 g/cm3 | | Density: 1.11 g/cm3 |
| | Index (589.3 nm - 20° C.): 1.49 | | Index (589.3 nm - 20° C.): 1.43 |
| | Viscosity (20° C.): 2.2 cSt | | Viscosity (20° C.): 17.5 cSt |

Formulation Example 6

The electrowetting optical device of Example 6 includes: a non-conductive liquid having 75.5 w/w/naphtyltriethylgermane, 15 w/w n-octyltris(trimethylsiloxy) silane, and 9.5% w/w Isopar P; and a conductive liquid having 60% w/w 1,3-propandiol, 38.8% w/w water, and 1.2% w/w sodium bromide.

| NON-CONDUCTIVE LIQUIDS | | CONDUCTIVE LIQUIDS | |
|---|---|---|---|
| % in weight | compound | % in weight | compound |
| 75.5% | 1-Naphtyltriethylgermane | 60% | 1,3-propandiol |
| 9.5% | Isopar P | 1.2% | Sodium bromide |
| 15% | n-octyltris(trimethylsiloxy)silane | 38.8% | Water |
| | Density: 1.05 g/cm3 | | Density: 1.05 g/cm3 |
| | Index (589.3 nm - 20° C.): 1.54 | | Index (589.3 nm - 20° C.): 1.40 |
| | Viscosity (20° C.): 8.3 cSt | | Viscosity (20° C.): 11.0 cSt |

Formulation Example 7

| NON-CONDUCTIVE LIQUIDS | | CONDUCTIVE LIQUIDS | |
|---|---|---|---|
| % in weight | compound | % in weight | compound |
| 80% | 2-ethylnaphthalene | 69% | Water |
| 20% | nonafluorohexyltris(trimethylsiloxy)silane | 30% | Ethylene glycol |
| | | 1% | Potassium acetate |
| | Density: 1.03 g/cm3 | | Density: 1.04 g/cm3 |
| | Index (589.3 nm - 20° C.): 1.53 | | Index (589.3 nm - 20° C.): 1.36 |
| | Viscosity (20° C.): 1.5 cSt | | Viscosity (20° C.): 2.3 cSt |

While exemplary embodiments and examples have been set forth for the purpose of illustration, the foregoing description is not intended in any way to limit the scope of disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:

1. A liquid lens device, comprising:
   (1) a body comprising a chamber defined therein and a layer of insulating material;
   (2) a non-conductive liquid located within the chamber, the non-conductive liquid having a conductivity less than about $1\times10^{-8}$ S/m;
   (3) a conductive liquid adjoining the non-conductive liquid within the chamber, the conductive liquid having a conductivity in a range of about $1\times10^{-3}$ S/m to $1\times10^{2}$ S/m;
   (4) an interface between the non-conductive liquid and the conductive liquid;
   (5) a common electrode in electrical communication with the conductive liquid; and
   (6) a driving electrode;
   wherein the interface has a shape that is influenced by a voltage differential between the driving electrode and the common electrode;
   wherein the conductive and non-conductive liquids are non-miscible such that their partial miscibility is less than 2% over a temperature range of −30° C. to 85° C.

2. The liquid lens device of claim 1, wherein the layer of insulating material comprises a hydrophobic surface located within a portion of the chamber that contacts the non-conductive liquid.

3. The liquid lens device of claim 1, wherein the conductive liquid comprises a polar solvent and a salt and the non-conductive liquid comprises a recovery agent dispersed therein.

4. The liquid lens device of claim 3, wherein the conductive liquid further comprises an antifreeze agent such that the conductive liquid remains a liquid at temperatures in a range from about −10° C. to 65° C.

5. The liquid lens device of claim 1, wherein the voltage differential is in a range from 25 V to 70 V.

6. The liquid lens device of claim 1, wherein the driving electrode comprises at least two driving electrodes.

7. The liquid lens device of claim 6, wherein the chamber includes a tapered portion, wherein the layer of insulating material extends along the tapered portion, and wherein the non-conductive liquid is located within the tapered portion.

8. The liquid lens device of claim 7, wherein the interface contacts the layer of insulating material along the tapered portion.

9. The liquid lens device of claim 8, wherein the driving electrode comprises a layer of conductive material that extends along the layer of insulating material, along the tapered portion.

10. The liquid lens device of claim 1, wherein a refractive index of the non-conductive liquid measured at 589.3 nm is in a range of about 1.55 to 1.70.

11. The liquid lens device of claim 10, wherein a density of the non-conductive liquid measured at 20° C. is in a range of about 0.90 g/cm$^3$ to 1.25 g/cm$^3$.

12. The liquid lens device of claim 11, wherein a viscosity of the non-conductive liquid measured at 20° C. is in a range of about 5 cSt to 35 cSt.

13. The liquid lens device of claim 1, wherein the conductive liquid and the non-conductive liquid have a transmission recovery of at least 95% in less than 4 hours.

14. A liquid lens device comprising:
(1) a body comprising a chamber defined therein and a layer of insulating material;
(2) a non-conductive liquid located within the chamber, the non-conductive liquid having a conductivity less than about $1 \times 10^{-8}$ S/m;
(3) a conductive liquid adjoining the non-conductive liquid within the chamber, the conductive liquid having a conductivity in a range from about $1 \times 10^{-3}$ S/m to $1 \times 10^2$ S/m;
(4) an interface between the non-conductive liquid and the conductive liquid;
(5) a common electrode in electrical communication with the conductive liquid; and
(6) a driving electrode positioned along the layer of insulating material, wherein the non-conductive liquid, the conductive liquid and the interface are in contact with the layer of insulating material, and the layer of insulating material is located between the driving electrode and the chamber such that driving electrode is electrically insulated from the non-conductive liquid and from the conductive liquid via the insulating layer;

wherein the interface has a shape that is influenced by a voltage differential between the driving electrode and the common electrode;

wherein the conductive and non-conductive liquids are non-miscible such that their partial miscibility is less than 2% over a temperature range of −30° C. to 85° C.

15. The liquid lens device of claim 14, wherein the layer of insulating material comprises a hydrophobic surface located within a portion of the chamber that contacts the non-conductive liquid.

16. The liquid lens device of claim 14, wherein the conductive liquid comprises a polar solvent and a salt, and the non-conductive liquid comprises a recovery agent dispersed therein.

17. The liquid lens device of claim 16, wherein the conductive liquid further comprises an antifreeze agent such that the conductive liquid remains a liquid at temperatures in a range from about −10° C. to 65° C.

18. A liquid lens device, comprising:
(1) a body comprising a chamber defined therein;
(2) a non-conductive liquid located within the chamber, the non-conductive liquid having a conductivity less than about $1 \times 10^{-8}$ S/m; and
(3) a conductive liquid adjoining the non-conductive liquid within the chamber, the conductive liquid having a conductivity in a range of about $1 \times 10^{-3}$ S/m to $1 \times 10^2$ S/m;

wherein the conductive and non-conductive liquids are non-miscible such that their partial miscibility is less than 2% over a temperature range of −30° C. to 85° C.

19. The liquid lens device of claim 18, wherein the conductive liquid comprises a polar solvent and a salt and the non-conductive liquid comprises a recovery agent dispersed therein.

20. The liquid lens device of claim 19, wherein the conductive liquid further comprises an antifreeze agent such that the conductive liquid remains a liquid at temperatures in a range from about −10° C. to 65° C.

* * * * *

UNITED STATES PATENT AND TRADEMARK OFFICE
CERTIFICATE OF CORRECTION

| | |
|---|---|
| PATENT NO. | : 11,204,492 B2 |
| APPLICATION NO. | : 16/734704 |
| DATED | : December 21, 2021 |
| INVENTOR(S) | : Benjamin Jean-Baptiste Francois Burger et al. |

It is certified that error appears in the above-identified patent and that said Letters Patent is hereby corrected as shown below:

On the Title Page

Item (54), Title, Line 1, delete "NAPHTYL" and insert -- NAPHTHYL --.

Item (72), Inventors, Line 2, delete "Lyons" and insert -- Lyon --.

In Column 2, item (56), Other Publications, Line 4, delete "(2013." and insert -- (2013). --.

In the Specification

In Column 1, Line 1, delete "NAPHTYL" and insert -- NAPHTHYL --.

Signed and Sealed this
Eighth Day of August, 2023

*Katherine Kelly Vidal*
Katherine Kelly Vidal
*Director of the United States Patent and Trademark Office*